United States Patent
Deng et al.

(10) Patent No.: US 10,101,556 B2
(45) Date of Patent: Oct. 16, 2018

(54) OPTICAL LENS ASSEMBLY

(71) Applicant: Genius Electronic Optical Co., Ltd., Taichung (TW)

(72) Inventors: Yiman Deng, Fujian (CN); Zhizhong Ji, Fujian (CN); Qiya Lin, Fujian (CN)

(73) Assignee: GENIUS ELECTRONIC OPTICAL (XIAMEN) CO., LTD., Xiamen (CN)

( * ) Notice: Subject to any disclaimer, the term of this patent is extended or adjusted under 35 U.S.C. 154(b) by 2 days.

(21) Appl. No.: 15/414,637

(22) Filed: Jan. 25, 2017

(65) Prior Publication Data
US 2018/0188472 A1 Jul. 5, 2018

(30) Foreign Application Priority Data
Dec. 29, 2016 (CN) .......................... 2016 1 1244763

(51) Int. Cl.
*G02B 7/02* (2006.01)
(52) U.S. Cl.
CPC ............. *G02B 7/025* (2013.01); *G02B 7/021* (2013.01)
(58) Field of Classification Search
CPC ...................................... G02B 7/025
USPC ........................................... 359/793
See application file for complete search history.

(56) References Cited

U.S. PATENT DOCUMENTS

2014/0218813 A1* 8/2014 Araki .................. G02B 7/021
359/819

* cited by examiner

*Primary Examiner* — James Jones
(74) *Attorney, Agent, or Firm* — JCIPRNET

(57) ABSTRACT

An optical lens assembly including at least two lens elements and an adhesive is provided. The lens elements are stacked disposed, and each of the lens elements includes an optical portion allowing imaging rays to pass through and an assembly portion configured to fix the lens. Each of the assembly portions of two adjacent lens elements includes an adhesive surface, and the adhesive surfaces are disposed opposite to each other to form an adhesive gap. The adhesive is distributed in the adhesive gap and adhered to fix the adhesive surfaces disposed opposite to each other. The adhesive surface of one lens element extends outwardly towards a direction away from an optical axis of the lens element to form an adhesive entering tapered surface configured to guide the adhesive into the adhesive gap.

19 Claims, 9 Drawing Sheets

OPTICAL LENS ASSEMBLY

CROSS-REFERENCE TO RELATED APPLICATION

This application claims the priority benefit of Chinese application serial no. 201611244763.6, filed on Dec. 29, 2016. The entirety of the above-mentioned patent application is hereby incorporated by reference herein and made a part of this specification.

BACKGROUND OF THE INVENTION

Field of the Invention

The invention relates to an optical lens assembly.

Description of Related Art

In recent years, with the rapid development of various types of portable electronic products, the need for key components thereof (e.g., an optical lens assembly) is also increasing. Generally speaking, in an assembly process of the optical lens assembly, after the lens elements of the optical lens assembly have been coaxially positioned to be stacked, they must be put into a housing first, and then dispensing between the housing and the lens elements to fix the positions of the lens elements. In other words, the fixation of the positions of the lens elements must rely on additional housing. Although the lens elements have been coaxially positioned before being put into the housing, the lens elements are put into the housing without being fixed. Thus, the relative position of the lens elements put into the housing will change so as to cause poor image quality and product yield of the optical lens assembly.

In addition, in such assembly fixing method, dispensed glue needs to fill the space between the housing and the lens element and the space between the lens elements. However, since the space required to be filled has a longer distance and has a number of transitions in the middle, the glue is prone to be unevenly distributed or unable to fully fill so as to cause poor fixing effect of the lens elements. Additionally, an amount of the dispensed glue is not easily controlled, so that the glue easily overflows to optical effective regions of the lens elements to affect the image quality, or the problem of insufficient amount of the glue easily occurs that the lens elements cannot be fixed effectively.

Many portable electronic products (e.g., mobile phones, cameras, tablet computers, personal digital assistants, automotive or unmanned aerial vehicle camera devices, or virtual reality display devices) are in a frequent and intense shaking environment in the use of the process. Thus, in order to maintain good image quality and extend the product life, the fixation between optical elements is an important study subject by those skilled in the art.

SUMMARY OF THE INVENTION

The invention provides an optical lens assembly, and a relative position of lens elements thereof can be fixed by an adhesive directly. Also, the positions of the lens elements do not shift in the process of being installed in a housing. Thus, the optical lens assembly can maintain good optical properties and high yield in the assembly process.

An embodiment of the invention provides an optical lens assembly including at least two lens elements and an adhesive. The lens elements are stacked disposed, and each of the lens elements includes an optical portion allowing imaging rays to pass through and an assembly portion configured to fix the lens. Each of the assembly portions of two adjacent lens elements includes an adhesive surface, and the adhesive surfaces are disposed opposite to each other to form an adhesive gap. The adhesive is distributed in the adhesive gap and adhered to fix the adhesive surfaces disposed opposite to each other. The adhesive surface of one of the lens elements extends outwardly towards a direction away from an optical axis of the lens element to form an adhesive entering tapered surface configured to guide the adhesive into the adhesive gap.

According to an embodiment of the invention, a width of the adhesive gap is in a range of 0.002 millimeters to 0.05 millimeters.

According to an embodiment of the invention, one of the two adjacent lens elements is a first lens element, and another of the two adjacent lens elements is a second lens element including the adhesive entering tapered surface. The assembly portion of the first lens element includes a surface located at an outer periphery of the first lens element. The adhesive entering tapered surface and the surface has an included angle, wherein the included angle is larger than 0 degree and smaller than 90 degrees.

According to an embodiment of the invention, each of the assembly portions of the two adjacent lens elements includes an axis-fixing tapered surface disposed between the adhesive surface and the optical portion. The axis-fixing tapered surfaces of the two adjacent lens elements are disposed opposite to each other, and the axis-fixing tapered surfaces are in fit contact with each other tightly such that the lens elements are coaxially fixed.

According to an embodiment of the invention, each of the assembly portions of the two adjacent lens elements includes an axis-fixing tapered surface disposed between the adhesive surface and the optical portion. The optical lens assembly includes an adhesive storage tank located between the axis-fixing tapered surfaces and the adhesive gap, and the adhesive storage tank is configured to accommodate the adhesive.

According to an embodiment of the invention, one of the two adjacent lens elements is a first lens element, and another of the two adjacent lens elements is a second lens element including the adhesive entering tapered surface. An outer diameter of the second lens element is larger than an outer diameter of the first lens element.

According to an embodiment of the invention, one of the two adjacent lens elements is a first lens element, and another of the two adjacent lens elements is a second lens element including the adhesive entering tapered surface. The second lens element is closer to an image sensor than the first lens element is.

According to an embodiment of the invention, the optical lens assembly further includes a housing, and the at least two lens elements are disposed in the housing.

According to an embodiment of the invention, a material of the adhesive includes a light curing material or a thermal curing material.

An embodiment of the invention provides an optical lens assembly including a first lens element, a gasket, and an adhesive. The first lens element includes an optical portion allowing imaging rays to pass through and an assembly portion configured to fix the first lens element. The gasket includes an assembly portion. The assembly portion of the first lens element includes a first adhesive surface. The assembly portion of the gasket includes a second adhesive surface, and the first adhesive surface and the second adhesive surface are disposed opposite to each other to form a first adhesive gap. The adhesive is distributed in the first adhesive gap and adhered to fix the first adhesive surface and the second adhesive surface disposed opposite to each other. The second adhesive surface extends outwardly towards a direction away from a central axis of the gasket to form a first adhesive entering tapered surface configured to guide the adhesive into the first adhesive gap.

According to an embodiment of the invention, a width of the first adhesive gap is in a range of 0.002 millimeters to 0.05 millimeters.

According to an embodiment of the invention, the assembly portion of the first lens element includes a surface located at an outer periphery of the first lens element. The first adhesive entering tapered surface and the surface has an included angle, wherein the included angle is larger than 0 degree and smaller than 90 degrees.

According to an embodiment of the invention, the optical lens assembly includes an adhesive storage tank. The adhesive storage tank is located between the first adhesive gap and the central axis of the gasket, and the adhesive storage tank is configured to accommodate the adhesive.

According to an embodiment of the invention, an outer diameter of the gasket is larger than an outer diameter of the first lens element.

According to an embodiment of the invention, the gasket is farther away from the object to be imaged than the first lens element is.

According to an embodiment of the invention, the optical lens assembly further includes a second lens element adjacent to and stacked disposed with the first lens element, and the gasket is disposed between the first lens element and the second lens element. The second lens element includes an optical portion allowing imaging rays to pass through and an assembly portion configured to fix the second lens element. The assembly portion of the second lens element includes a third adhesive surface. The assembly portion of the gasket further includes a fourth adhesive surface, and the third adhesive surface and the fourth adhesive surface are disposed opposite to each other to form a second adhesive gap. The adhesive is further distributed in the second adhesive gap and adhered to fix the third adhesive surface and the fourth adhesive surface disposed opposite to each other. The third adhesive surface extends outwardly towards a direction away from an optical axis of the second lens element to form a second adhesive entering tapered surface configured to guide the adhesive into the second adhesive gap.

According to an embodiment of the invention, the assembly portion of the first lens element includes a first axis-fixing tapered surface disposed between the first adhesive surface and the optical portion, and the assembly portion of the second lens element includes a second axis-fixing tapered surface disposed between the third adhesive surface and the optical portion. Both the first axis-fixing tapered surface and the second axis-fixing tapered surface are in contact with the gasket such that the first lens element and the second lens element are coaxially fixed.

According to an embodiment of the invention, the optical lens assembly further includes a housing, and the first lens element and the gasket are disposed in the housing.

According to an embodiment of the invention, a material of the adhesive includes a light curing material or a thermal curing material.

According to an embodiment of the invention, a viscosity of the adhesive is in a range of 100 mPa·s to 20000 mPa·s.

Based on the above, in the optical lens assembly of the embodiment of the invention, the adhesive can be guided into the adhesive gap by the adhesive entering tapered surface. The adhesive into the adhesive gap is adhered to fix the adhesive surfaces disposed opposite to each other, thereby fixing the lens elements of the optical lens assembly. Therefore, the relative position between the lens elements can be fixed by the adhesive directly without fixing by relying on additional housing. Also, when the lens elements are installed in the housing, the relative position between the lens elements does not shift. Additionally, since the adhesive does not have to be adhered to the lens element through the adhesive entering flow channel having a longer internal distance and having more transitions in a general housing, the filling amount of the adhesive of the embodiment of the invention is easily controlled to be more appropriate. Also, the distribution of the adhesive in the adhesive gap will be more even. Therefore, the optical lens assembly of the embodiment of the invention can maintain good optical properties and high yield in the assembly process.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
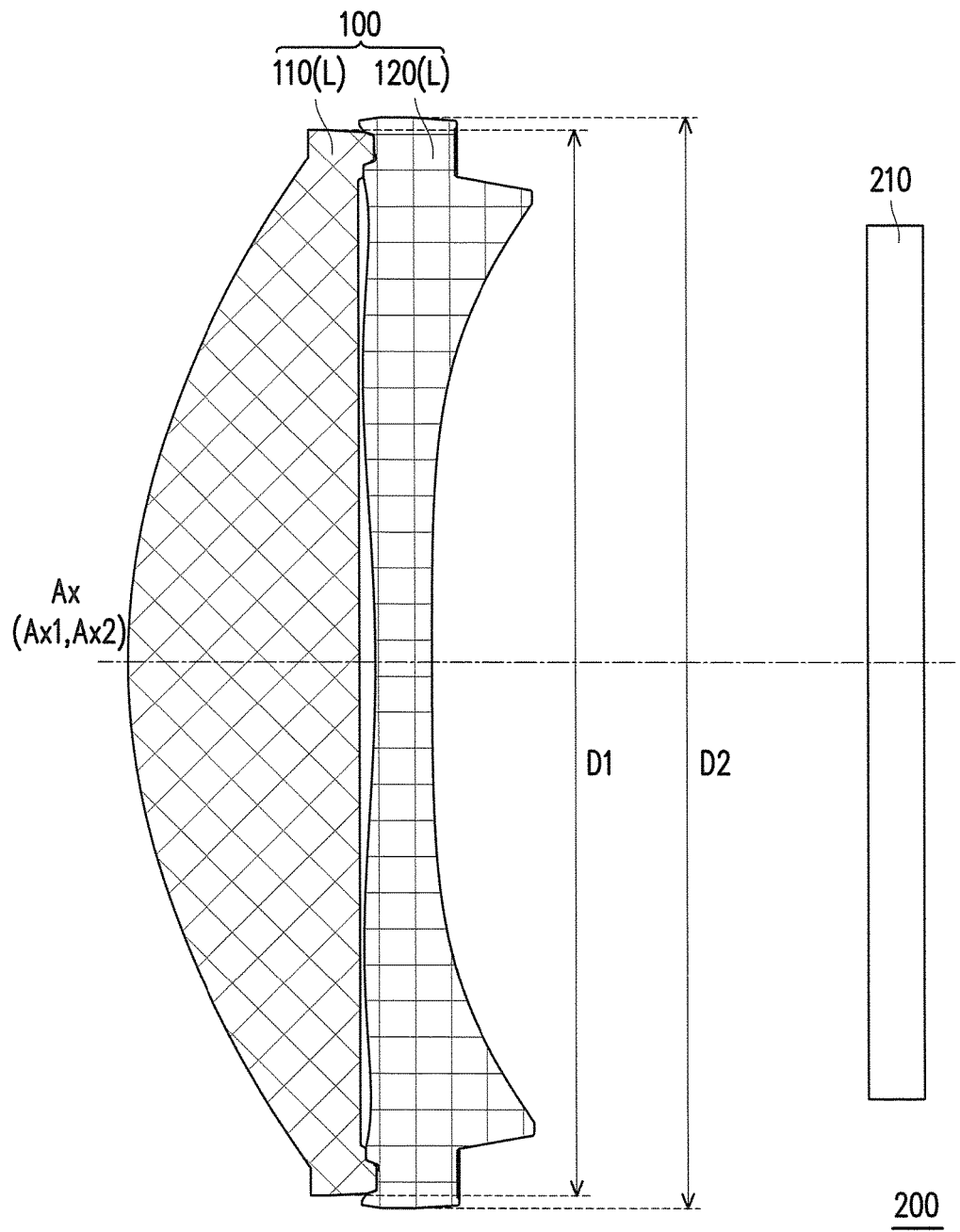
FIG. 1 is a schematic cross-sectional view illustrating a camera device and an optical lens assembly thereof according to an embodiment of the invention.

FIG. 1 is a schematic cross-sectional view illustrating a camera device and an optical lens assembly thereof according to an embodiment of the invention. Referring to FIG. 1, in the embodiment, an optical lens assembly 100 may be used in portable electronic products, for example, such as in an optical imaging lens of mobile phones, cameras, tablet computers, or personal digital assistants (PDAs), or may be used in automotive lenses, unmanned aerial vehicle camera devices, sports camera equipments, and other devices often in frequent shaking. For instance, in the embodiment, the optical lens assembly 100 is used in a camera device 200. The camera device 200 includes the optical lens assembly 100 and an image sensor 210, and imaging rays of a subject passes through the optical lens assembly 100 so as to be received by the image sensor 210. In some embodiments, the optical lens assembly 100 may also be used in virtual reality (VR) display devices, for example. When the user wears and uses the virtual reality display device, the imaging rays provided by the display passes through the optical lens assembly 100 to enter the eyes of the user.

Figure 2:
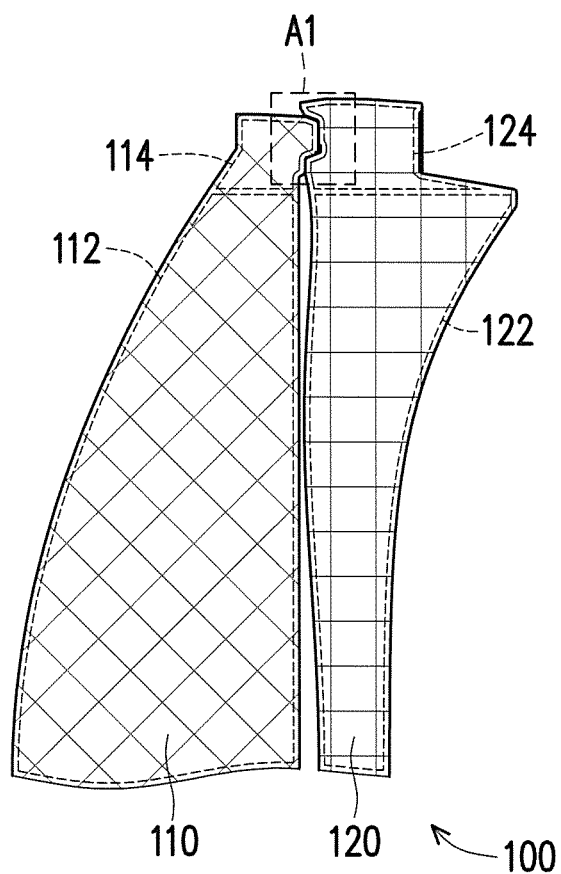
FIG. 2 is a schematic cross-sectional view illustrating a portion of the optical lens assembly in the embodiment of FIG. 1.

FIG. 2 is a schematic cross-sectional view illustrating a portion of the optical lens assembly in the embodiment of FIG. 1. It is noted that in order to clearly illustrate the position of an assembly portion of the lens element, only approximately half of the region of the cross-section of the lens element illustrated in FIG. 2 and FIG. 6 and FIG. 8 thereafter is illustrated. Referring to FIG. 1 and FIG. 2 at the same time, in the embodiment, the optical lens assembly 100 includes at least two lens elements L, and the lens elements L are stacked disposed. Particularly, the optical lens assembly 100 includes a first lens element 110 and a second lens element 120, and the first lens element 110 and the second lens element 120 are stacked disposed. Additionally, in the optical lens assembly 100 used in the camera device 200 of the embodiment, the second lens element 120 is farther away from an object to be imaged than the first lens element 110 is, and the second lens element 120 is closer to the image sensor 210 than the first lens element 110 is (as shown in FIG. 1), for example, wherein the aforementioned object to be imaged is the subject, for example. However, in some embodiments used in the virtual reality display devices or other display devices, the second lens element 120 is closer to a screen than the first lens element 110 is, and farther away from the pupil of the user than the first lens element 110 is, for example. However, the invention is not limited thereto. In addition, in some embodiments, the optical lens assembly 100 may include other numbers of the lens elements. The invention does not limit the number of the lens elements.

In the embodiment, each of the lens elements L of the optical lens assembly 100 includes an optical portion allowing imaging rays to pass through and an assembly portion configured to fix the lens element L. Specifically, the first lens element 110 includes an optical portion 112 and an assembly portion 114, and the second lens element 120 includes an optical portion 122 and an assembly portion 124. Optical effective regions of the first lens element 110 and the second lens element 120 are respectively located on the optical portion 112 and the optical portion 122. That is to say that the optical portion 112 and the optical portion 122 respectively cover a range of a clear aperture (CA) of the first lens element 110 and the second lens element 120. Additionally, the assembly portion 114 and the assembly portion 124 are respectively located at a periphery of the optical portion 112 and the optical portion 122, and the assembly portion 114 and the assembly portion 124 are respectively configured to fix the first lens element 110 and the second lens element 120. When the optical lens assembly 100 is assembled, an adhesive is adhered to the assembly portion 114 and the assembly portion 124 such that the relative position of the first lens element 110 and the second lens element 120 is fixed. Particularly, optical axes Ax of the lens elements L of the optical lens assembly 100 are coincident with each other. For instance, an optical axis Ax1 of the first lens element 110 and an optical axis Ax2 of the second lens element 120 are coincident with each other.

Additionally, the lens elements L have circular symmetry relative to the optical axis Ax. That is to say that, for any one single lens element L, the cross-sections obtained by cutting along any plane including the optical axis Ax are the same.

Figure 3:
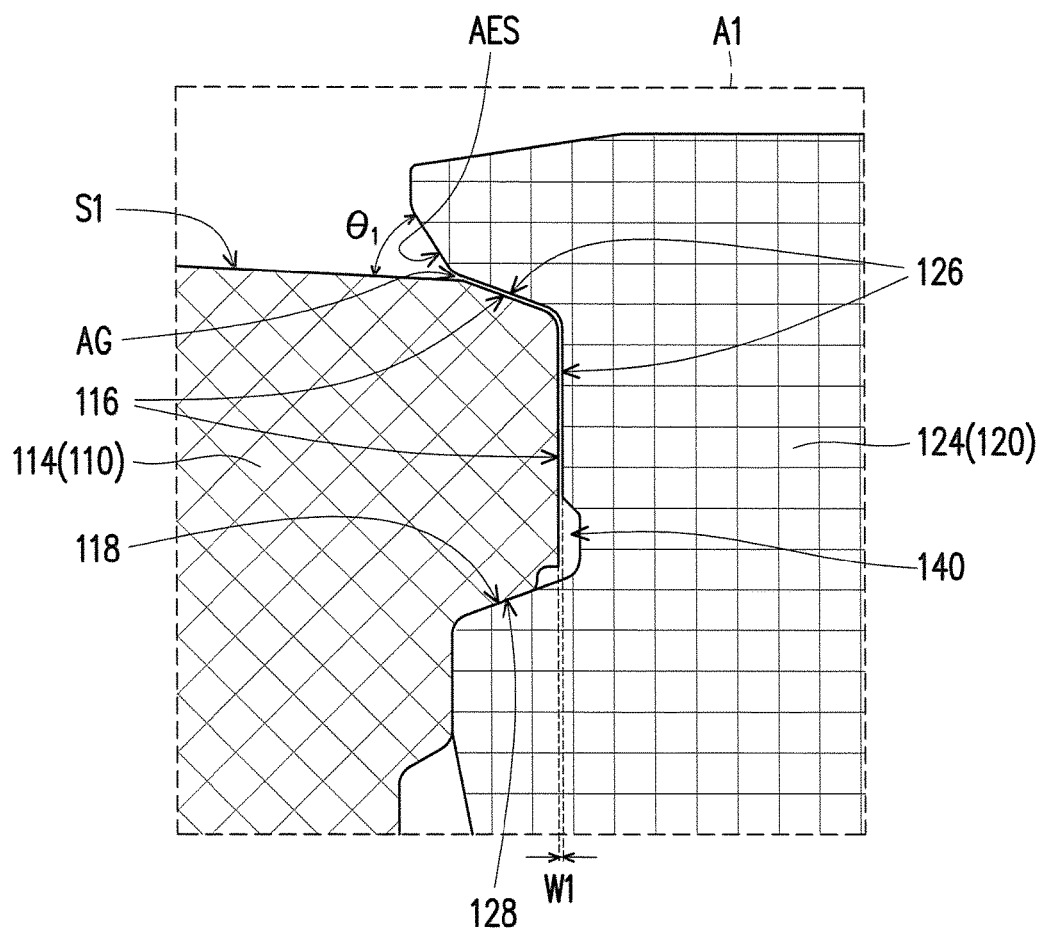
FIG. 3 is an enlarged schematic view illustrating a region A1 when the optical lens assembly has not yet been filled with an adhesive of the embodiment of FIG. 2.

FIG. 3 is an enlarged schematic view illustrating a region A1 when the optical lens assembly has not yet been filled with an adhesive of the embodiment of FIG. 2. Referring to FIG. 3, in the embodiment, each of the assembly portions of two adjacent lens elements L of the optical lens assembly 100 includes an adhesive surface, and the adhesive surfaces are disposed opposite to each other to form an adhesive gap AG. Particularly, the assembly portion 114 of the first lens element 110 includes an adhesive surface 116, and the assembly portion 124 of the second lens element 120 adjacent to the first lens element 110 includes an adhesive surface 126. Additionally, the adhesive surface 116 and the adhesive surface 126 are disposed opposite to each other to form the adhesive gap AG. In the embodiment, each of the assembly portions of the two adjacent lens elements includes an axis-fixing tapered surface disposed between the adhesive surface and the optical portion. The axis-fixing tapered surfaces of the two adjacent lens elements L are disposed opposite to each other, and the axis-fixing tapered surfaces are in contact with each other such that the lens elements L are coaxially fixed. Particularly, one of the two adjacent lens elements L is the first lens element 110, and another of the two adjacent lens elements L is the second lens element 120. The assembly portion 114 of the first lens element 110 includes an axis-fixing tapered surface 118 disposed between the adhesive surface 116 and the optical portion 112 (the optical portion 112 as shown in FIG. 2), and the assembly portion 124 of the second lens element 120 includes an axis-fixing tapered surface 128 disposed between the adhesive surface 126 and the optical portion 122 (the optical portion 122 as shown in FIG. 2). The axis-fixing tapered surface 118 and the axis-fixing tapered surface 128 are disposed opposite to each other. When the first lens element 110 and the second lens element 120 are assembled, the axis-fixing tapered surface 118 and the axis-fixing tapered surface 128 are in contact with each other and fit tightly, so that the first lens element 110 and the second lens element 120 can be coaxially positioned effectively and less prone to slippage. At this time, the relative position of the first lens element 110 and the second lens element 120 will meet expectations, and the optical axis Ax1 of the first lens element 110 and the optical axis Ax2 of the second lens element 120 will be coincident with each other, for example.

Figure 4:
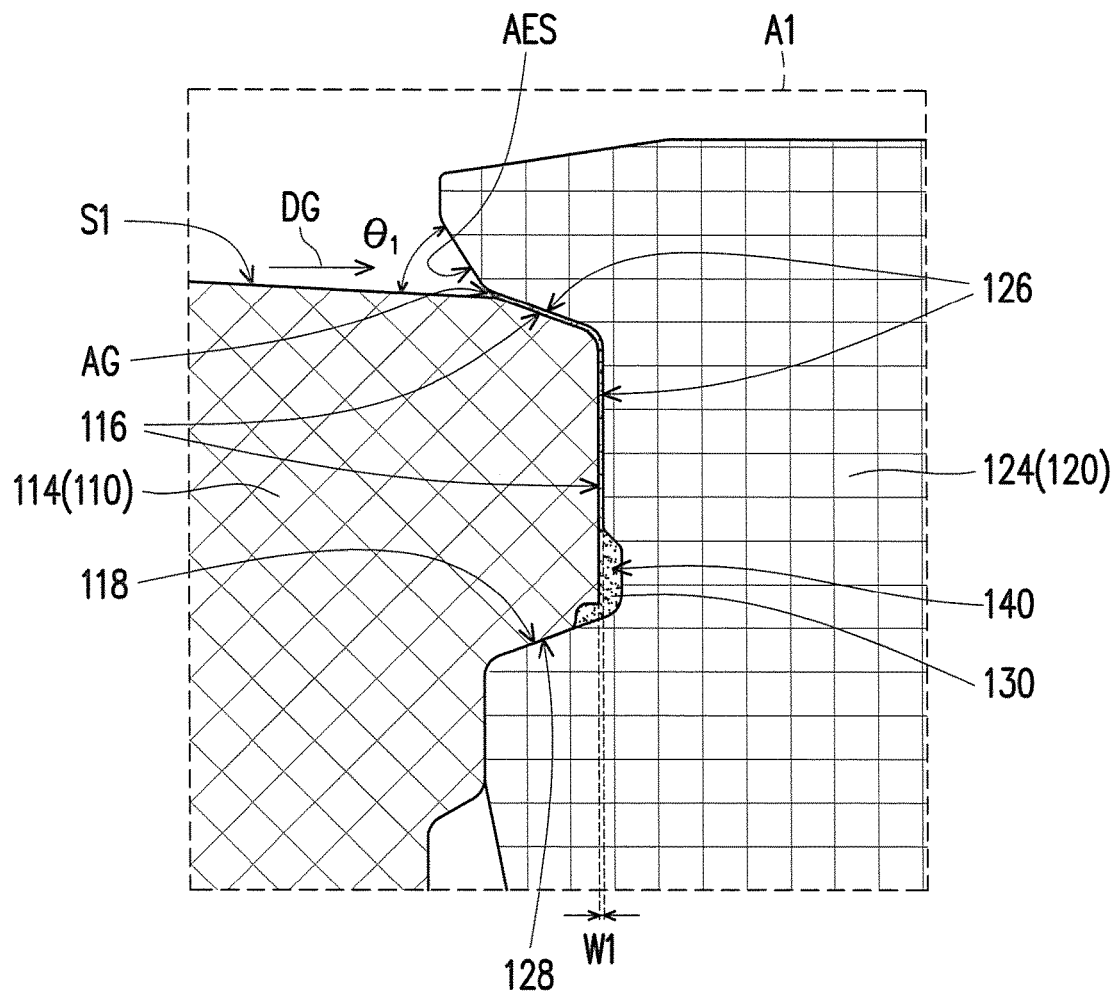
FIG. 4 is an enlarged schematic view illustrating a region A1 when the optical lens assembly has been filled with an adhesive of the embodiment of FIG. 2.

Continuing to refer to FIG. 3, in the embodiment, the adhesive surface of one lens element L of the optical lens assembly 100 extends outwardly towards a direction away from the optical axis of the lens element L to form an adhesive entering tapered surface AES configured to guide the adhesive 130 (the adhesive 130 as shown in FIG. 4) into the adhesive gap AG. Particularly, the assembly portion 114 of the first lens element 110 includes a surface S1 located at an outer periphery of the first lens element 110. The adhesive surface 126 of the second lens element 120 extends outwardly towards a direction away from the optical axis Ax2 (the optical axis Ax2 as shown in FIG. 1) of the second lens element 120 to form the adhesive entering tapered surface AES. Specifically, referring to FIG. 1, an outer diameter D2 of the second lens element 120 is larger than an outer diameter D1 of the first lens element 110, for example, so that the adhesive entering tapered surface AES extending outwardly and the surface S1 has an included angle $\theta_1$, and the included angle $\theta_1$ is larger than 0 degree and smaller than 90 degrees, for example. Additionally, in the embodiment, the adhesive entering tapered surface AES is inclined with respect to the optical axis Ax2, and an inclined angle of the adhesive entering tapered surface AES with respect to the optical axis Ax2 is larger than 0 degree and smaller than 90 degrees, for example.

FIG. 4 is an enlarged schematic view illustrating a region A1 when the optical lens assembly has been filled with an adhesive of the embodiment of FIG. 2. Referring to FIG. 4, in the embodiment, when the first lens element 110 and the second lens element 120 are assembled, the axis-fixing tapered surface 118 and the axis-fixing tapered surface 128 are in contact with each other, so that the first lens element 110 and the second lens element 120 are coaxially fixed. At this time, the dispensing may be performed at an entrance of the adhesive gap AG formed between the surface S1 of the first lens element 110 and the adhesive entering tapered surface AES along a dispensing direction DG, for example, so that the adhesive 130 configured to adhere the first lens element 110 to the second lens element 120 can be guided into the adhesive gap AG by the adhesive entering tapered surface AES. In the embodiment, a material of the adhesive 130 includes a light curing material, a thermal curing material, or other types of material, for example. Additionally, a viscosity of the adhesive 130 is in a range of 100 millipascal-second (mPa·s) to 20000 mPa·s, for example. The invention is not limited thereto.

Particularly, referring to FIG. 3, the adhesive into the adhesive gap AG is distributed in the adhesive gap AG and adhered to fix the adhesive surface 116 and the adhesive surface 126 disposed opposite to each other, thereby fixing the first lens element 110 and the second lens element 120. Specifically, a width W1 of the adhesive gap AG is in a range of 0.002 millimeters to 0.05 millimeters, for example. When the width W1 is larger than or equal to 0.002 millimeters, the width W1 is never too narrow causing the adhesive 130 being difficult to flow. When the width W1 is smaller than or equal to 0.05 millimeters, the width W1 is never too wide causing the adhesive 130 being difficult to adhere the adhesive surface 116 to the adhesive surface 126. Additionally, the optical lens assembly 100 further includes an adhesive storage tank 140 located between the axis-fixing tapered surface 118 (or the axis-fixing tapered surface 128) and the adhesive gap AG, and the adhesive storage tank 140 is configured to accommodate the adhesive 130. In the embodiment, the adhesive storage tank 140 can ensure that the adhesive gap AG is filled with the adhesive 130, and the adhesive 130 will not overflow to the optical portion 112 of the first lens element 110 and the optical portion 122 of the second lens element 120 to affect image quality. Additionally, the optical lens assembly 100 may further include a housing (not shown), and the housing is a barrel, for example. After the positions of the first lens element 110 and the second lens element 120 are fixed by the adhesive 130, the first lens element 110 and the second lens element 120 can be installed in the housing.

Figure 5:
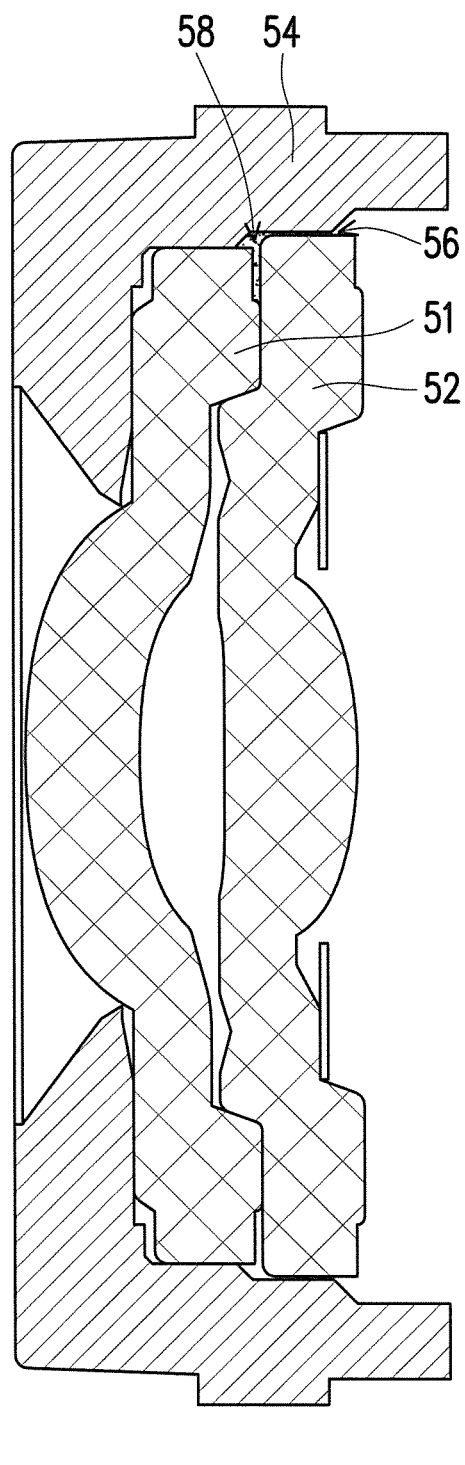
FIG. 5 is a schematic cross-sectional view illustrating the optical lens assembly according to a comparative embodiment.

FIG. 5 is a schematic cross-sectional view illustrating the optical lens assembly according to a comparative embodiment. Referring to FIG. 5, in the comparative embodiment, an optical lens assembly 50 includes a lens element 51 and a lens element 52 stacked disposed, and the lens element 51 and the lens element 52 are disposed in a barrel 54. The lens element 51 and the lens element 52 are not provided with the adhesive entering tapered surface AES as the embodiments of FIG. 1 to FIG. 4. Thus, a flow channel suitable for guiding an adhesive 58 to flow to adhere directly cannot be formed after the lens element 51 and the lens element 52 are coaxially positioned. Specifically, in an assembly process of the optical lens assembly 50, after the lens element 51 and the lens element 52 have been coaxially positioned to be stacked, they should be put into the barrel 54 first. At this time, gaps between the lens element 51, the lens element 52, and the barrel 52 will form an adhesive flow channel 56 for the adhesive 58 to flow. Then, the dispensing is performed on the adhesive flow channel 56 to fix the positions of the lens element 51 and the lens element 52. That is to say that the fixation of the positions of the lens element 51 and the lens element 52 must rely on an additional housing 54.

In the comparative embodiment of FIG. 5, although the lens element 51 and the lens element 52 have been coaxially positioned before being put into the housing 54, the lens element 51 and the lens element 52 are put into the barrel 54 without being fixed. Thus, the relative position of the lens element 51 and the lens element 52 is easily changed in the process of being put into the barrel 54, so as to cause poor image quality and product yield of the optical lens assembly 50. Additionally, the adhesive 58 must flow along inner walls of the barrel 54 and flow into the gap between two adjacent lens elements, so that the adhesive flow channel 56 has a longer distance and has a larger transition which is not conducive to the filling of the adhesive 58. In other similar comparative embodiments, when the number of the lens elements is more, the adhesive flow channel 56 will have a longer distance and have more transitions which is not more conducive to the filling of the adhesive 58. Therefore, in the comparative embodiment of FIG. 5 and the related comparative embodiments, the adhesive 58 is prone to be unevenly distributed or unable to fully fill so as to cause poor fixing effect of the lens elements (e.g., the lens element 51 and the lens element 52). Additionally, the amount of the adhesive 58 is not easily controlled. The adhesive 58 easily overflows to the optical effective regions of the lens elements (e.g., the lens element 51 and the lens element 52) to affect the image quality, or the problem of insufficient amount of the adhesive 58 easily occurs so that the lens elements (e.g., the lens element 51 and the lens element 52) cannot be fixed effectively.

Compared with the comparative embodiment of FIG. 5 and the related comparative embodiments, in the embodiments of the invention of FIG. 1 to FIG. 4, the adhesive 130 can be guided into the adhesive gap AG by the adhesive entering tapered surface AES, so that the positions of the first lens element 110 and the second lens element 120 can be fixed by the adhesive 130 directly without fixing by relying on an additional housing. Also, when the first lens element 110 and the second lens element 120 are installed in the housing, the positions of the first lens element 110 and the second lens element 120 will not shift. Thus, the optical lens assembly 100 can maintain good optical properties and high yield in the assembly process. Additionally, since the adhesive gap AG has a shorter distance, less and smaller transitions compared with the adhesive entering flow channel inside a general housing, the distribution of the adhesive 130 in the adhesive gap AG will be more even and the filling amount of the adhesive 130 will be easily controlled to be more appropriate.

In the embodiment of the invention, the adhesive entering tapered surface AES and the surface S1 has a suitable included angle $\theta_1$, so that the adhesive 130 can enter into the adhesive gap AG successfully, so as to prevent the adhesive 130 from overflowing from a direction perpendicular to the dispensing direction DG. Additionally, the outer diameter D2 of the second lens element 120 is larger than the outer diameter D1 of the first lens element 110, so that the adhesive entering tapered surface AES is easily disposed on the second lens element 120, and the degree of difficulty of the manufacturing process thereof is lower. Specifically, the lens element of the optical lens assembly 100 closer to the position of the image plane (e.g., the position of the image sensor 210) will be designed to be larger generally. For example, the outer diameter D2 of the second lens element 120 will be designed to be larger than the outer diameter D1 of the first lens element 110, so that the imaging rays can indeed be received. Even in some optical lens assembly configured to a wide-angle lens except the large-size lens element closest to the object to be imaged, in other lens elements, the lens element close to the position of the image plane is also designed to be larger. Therefore, the adhesive entering tapered surface AES is disposed at the lens element (e.g., the second lens element 120) close to the position of the image plane will conducive to saving production costs.

Figure 6:
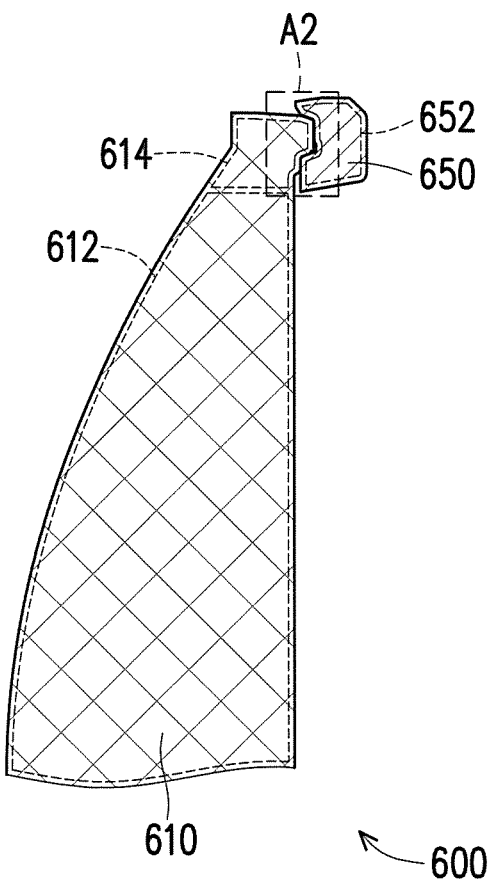
FIG. 6 is a schematic cross-sectional view illustrating a portion of the optical lens assembly according to another embodiment of the invention.
Figure 7:
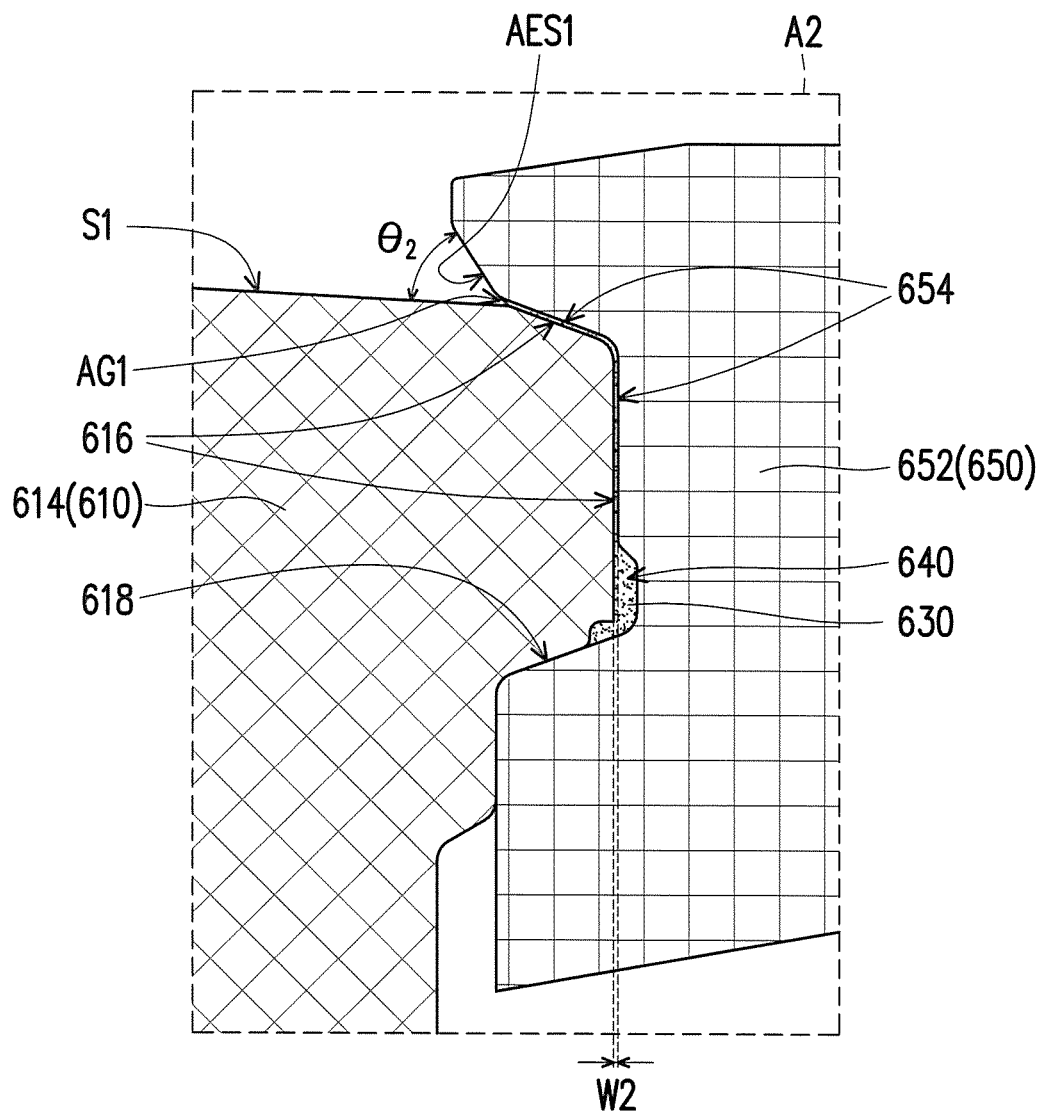
FIG. 7 is an enlarged schematic view illustrating a region A2 of the embodiment of FIG. 6.

FIG. 6 is a schematic cross-sectional view illustrating a portion of the optical lens assembly according to another embodiment of the invention, and FIG. 7 is an enlarged schematic view illustrating a region A2 of the embodiment of FIG. 6. An optical lens assembly 600 is similar to the optical lens assembly 100 of the embodiments of FIG. 1 to FIG. 4. The components and the related description of the optical lens assembly 600 can be referred to that of the optical lens assembly 100 of the embodiment of FIG. 1, and will not be repeated. The difference between the optical lens assembly 600 and the optical lens assembly 100 is described as below. Referring to FIG. 6 first, in the embodiment, the optical lens assembly 600 includes a first lens element 610 and a gasket 650. The first lens element 610 includes an optical portion 612 allowing imaging rays to pass through and an assembly portion 614 configured to fix the first lens element 610, and the gasket 650 includes an assembly portion 652. Referring to FIG. 7, the assembly portion 614 of the first lens element 610 includes a first adhesive surface 616. The assembly portion 652 of the gasket 650 includes a second adhesive surface 654. The first adhesive surface 616 and the second adhesive surface 654 are disposed opposite to each other to form a first adhesive gap AG1.

In the embodiment, an optical axis (not shown) of the first lens element 610 and a central axis (not shown) of the gasket 650 are coincident with each other, for example. Additionally, the optical lens assembly 600 includes an adhesive 630. The second adhesive surface 654 extends outwardly towards a direction away from the central axis of the gasket 650 to form a first adhesive entering tapered surface AES1 configured to guide the adhesive 630 into the first adhesive gap AG1. Specifically, the assembly portion 614 of the first lens element 610 includes the surface S1 located at the outer periphery of the first lens element 610, and the first adhesive entering tapered surface AES1 and the surface S1 has an included angle $\theta_2$. The included angle $\theta_2$ is larger than 0 degree and smaller than 90 degrees, for example. Additionally, a width W2 of the first adhesive gap AG1 is in a range of 0.002 millimeters to 0.05 millimeters, for example. In the embodiment, the adhesive 630 is similar to the adhesive 130 of the embodiments of FIG. 1 to FIG. 4, for example, and the description of materials or properties thereof can be referred to that of the adhesive 130 and will not be repeated.

In the embodiment, the optical lens assembly 600 may include a plurality of lens elements, for example, and the first lens element 610 is the lens element farthest away from the object to be imaged in these lens elements. The gasket 650 is farther away from the object to be imaged than the first lens element 610 is, and the gasket 650 may be fixed on a lens holder, for example. Additionally, an outer diameter of the gasket 650 is larger than an outer diameter of the first lens element 610. Particularly, the assembly portion 614 of the first lens element 610 includes an axis-fixing tapered surface 618 disposed between the first adhesive surface 616 and the optical portion 612. When the first lens element 610 and the gasket 650 are assembled, the axis-fixing tapered surface 618 will be in contact with the gasket 650, so that the position of the first lens element 610 can be fixed and less prone to slippage. At this time, the dispensing may be performed at an entrance of the first adhesive gap AG1, so that the adhesive 630 configured to adhere the first lens element 610 to the gasket 650 can be guided into the first adhesive gap AG1 by the first adhesive entering tapered surface AES1. In the embodiment, the adhesive 630 into the first adhesive gap AG1 by dispensing is distributed in the first adhesive gap AG1 and adhered to fix the first adhesive surface 616 and the second adhesive surface 654 disposed opposite to each other. Additionally, the optical lens assembly 600 includes an adhesive storage tank 640. The adhesive storage tank 640 is located between the first adhesive gap AG1 and the central axis of the gasket 650, and the adhesive storage tank 640 is configured to accommodate the adhesive 630. Additionally, the optical lens assembly 600 may also include a housing (not shown), for example, and the first lens element 610 and the gasket 650 are disposed in the housing.

In the embodiment, the adhesive 630 can be guided into the first adhesive gap AG1 by the first adhesive entering tapered surface AES1, so that the positions of the first lens element 610 and the gasket 650 can be fixed by the adhesive 630 directly without fixing by relying on an additional housing. The optical lens assembly 600 can obtain at least the effects described in the optical lens assembly 100 of the embodiments of FIG. 1 to FIG. 4. The position of the first lens element 610 does not shift in the process of being installed in the housing. Also, the filling amount of the adhesive 630 is also easily controlled to be more appropriate, so that the optical lens assembly 600 can maintain good optical properties and high yield in the assembly process.

Figure 8:
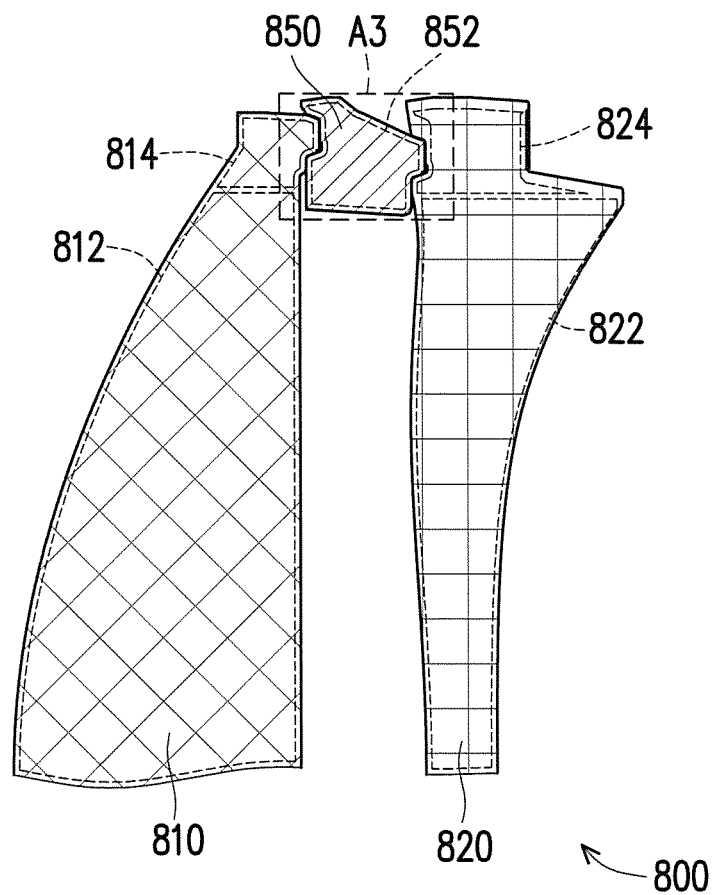
FIG. 8 is a schematic cross-sectional view illustrating a portion of the optical lens assembly according to yet another embodiment of the invention.
Figure 9:
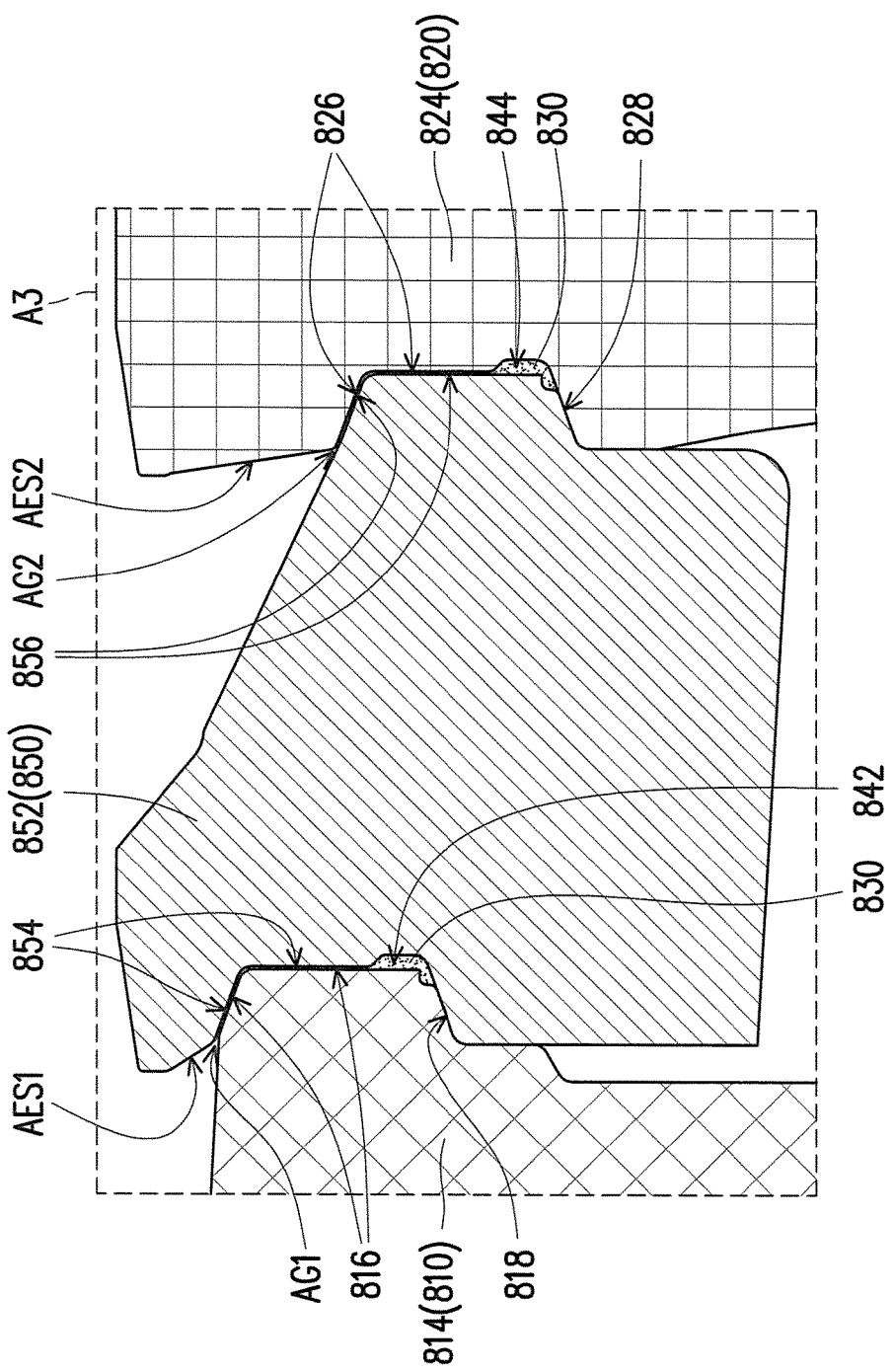
FIG. 9 is an enlarged schematic view illustrating a region A3 of the embodiment of FIG. 8.

FIG. 8 is a schematic cross-sectional view illustrating a portion of the optical lens assembly according to yet another embodiment of the invention, and FIG. 9 is an enlarged schematic view illustrating a region A3 of the embodiment of FIG. 8. An optical lens assembly 800 is similar to the optical lens assembly 600 of the embodiments of FIG. 6 to FIG. 7. The components and the related description of the optical lens assembly 800 can be referred to that of the optical lens assembly 600 of the embodiments of FIG. 6 to FIG. 7, and will not be repeated. The difference between the optical lens assembly 800 and the optical lens assembly 600 is described as below. Referring to FIG. 8 first, in the embodiment, the optical lens assembly 800 includes a first lens element 810, a second lens element 820, and a gasket 850. The second lens element 820 and the first lens element 810 are adjacent to each other and stacked disposed, and the gasket 850 is disposed between the first lens element 810 and the second lens element 820. The first lens element 810 includes an optical portion 812 allowing imaging rays to pass through and an assembly portion 814 configured to fix the first lens element 810. The second lens element 820 includes an optical portion 822 allowing the imaging rays to pass through and an assembly portion 824 configured to fix the second lens element 820. Additionally, the gasket 850 includes an assembly portion 852.

Referring to FIG. 9, the assembly portion 814 of the first lens element 810 includes a first adhesive surface 816, and the assembly portion 824 of the second lens element 820 includes a third adhesive surface 826. The assembly portion 852 of the gasket 850 includes a second adhesive surface 854 and a fourth adhesive surface 856. The first adhesive surface 816 and the second adhesive surface 854 are disposed opposite to each other to form a first adhesive gap AG1, and the third adhesive surface 826 and the fourth adhesive surface 856 are disposed opposite to each other to form a second adhesive gap AG2. In the embodiment, an optical axis (not shown) of the first lens element 810, a central axis (not shown) of the gasket 850, and an optical axis (not shown) of the second lens element 820 are coincident with each other, for example. The optical lens assembly 800 includes an adhesive 830. The second adhesive surface 854 extends outwardly towards a direction away from the central axis of the gasket 850 to form a first adhesive entering tapered surface AES1 configured to guide the adhesive 830 into the first adhesive gap AG1, and the third adhesive surface 826 extends outwardly towards a direction away from the optical axis of the second lens element 820 to form a second adhesive entering tapered surface AES2 configured to guide the adhesive 830 into the second adhesive gap AG2.

In the embodiment, the optical lens assembly 800 may include a plurality of lens elements, for example, and the first lens element 810 and the second lens element 820 are two adjacent lens elements, for example. Particularly, the assembly portion 814 of the first lens element 810 includes a first axis-fixing tapered surface 818 disposed between the first adhesive surface 816 and the optical portion 812, and the assembly portion 824 of the second lens element 820 includes a second axis-fixing tapered surface 828 disposed between the third adhesive surface 826 and the optical portion 822. When the first lens element 810, the second lens element 850, and the gasket 850 are assembled, both the first axis-fixing tapered surface 818 and the second axis-fixing tapered surface 828 are in contact with the gasket 850, so that the first lens element 810 and the second lens element 820 are coaxially fixed and less prone to slippage. At this time, the dispensing may be performed at an entrance of the first adhesive gap AG1 and an entrance of the second adhesive gap AG2 respectively. The adhesive 830 is guided into the first adhesive gap AG1 by the first adhesive entering tapered surface AES1, and the adhesive 830 is also guided into the second adhesive gap AG2 by the second adhesive entering tapered surface AES2.

In the embodiment, the adhesive 830 is distributed in the first adhesive gap AG1 and adhered to fix the first adhesive surface 816 and the second adhesive surface 854 disposed opposite to each other, and the adhesive 830 is further distributed in the second adhesive gap AG2 and adhered to fix the third adhesive surface 826 and the fourth adhesive surface 856 disposed opposite to each other. Additionally, the optical lens assembly 800 includes an adhesive storage tank 842 and an adhesive storage tank 844, and both the adhesive storage tank 842 and the adhesive storage tank 844 are configured to accommodate the adhesive 830. The adhesive storage tank 842 is located between the first adhesive gap AG1 and the central axis of the gasket 850, and the adhesive storage tank 844 is located between the second adhesive gap AG2 and the optical axis of the second lens element 820.

In the embodiment, the adhesive 830 can be guided into the first adhesive gap AG1 and the second adhesive gap AG2 by the first adhesive entering tapered surface AES1 and the second adhesive entering tapered surface AES2 respectively, so that the positions of the first lens element 810 and the second lens element 820 can be fixed by the adhesive 830 directly without fixing by relying on an additional housing.

The optical lens assembly 800 can obtain at least the effects described in the optical lens assembly 100 of the embodiments of FIG. 1 to FIG. 4. The positions of the first lens element 810 and the second lens element 820 do not shift in the process of being installed in the housing. Also, the filling amount of the adhesive 830 is also easily controlled to be more appropriate, so that the optical lens assembly 800 can maintain good optical properties and high yield in the assembly process.

In summary, in the optical lens assembly of the embodiment of the invention, the adhesive can be guided into the adhesive gap by the adhesive entering tapered surface. The adhesive into the adhesive gap is adhered to fix the adhesive surfaces disposed opposite to each other, thereby fixing the lens elements of the optical lens assembly. Therefore, the relative position of the lens elements can be fixed by the adhesive directly without fixing by relying on an additional housing. Also, when the lens elements are installed in the housing, the relative position of the lens elements does not shift. Additionally, since the adhesive does not have to be adhered to the lens through the adhesive entering flow channel having a longer internal distance and having more transitions in a general housing, the filling amount of the adhesive of the embodiment of the invention is easily controlled to be more appropriate. Also, the distribution of the adhesive in the adhesive gap will be more even. Therefore, the optical lens assembly of the embodiment of the invention can maintain good optical properties and high yield in the assembly process.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. An optical lens assembly, comprising:
   at least two lens elements, the lens elements being stacked disposed, and each of the lens elements comprising an optical portion allowing imaging rays to pass through and an assembly portion configured to fix the each of the lens elements, wherein each of the assembly portions of two adjacent lens elements comprises an adhesive surface, and the adhesive surfaces are disposed opposite to each other to form an adhesive gap; and
   an adhesive, distributed in the adhesive gap and adhered to fix the adhesive surfaces disposed opposite to each other, wherein the adhesive surface of one of the lens elements extends outwardly towards a direction away from an optical axis of the lens element to form an adhesive entering tapered surface configured to guide the adhesive into the adhesive gap;
   wherein each of the assembly portions of the two adjacent lens elements comprises an axis-fixing tapered surface disposed between the adhesive surface and the optical portion, the axis-fixing tapered surfaces of the two adjacent lens elements are disposed opposite to each other, and the axis-fixing tapered surfaces are in fit contact with each other tightly such that the lens elements are coaxially fixed.

2. The optical lens assembly according to claim 1, wherein a width of the adhesive gap is in a range of 0.002 millimeters to 0.05 millimeters.

3. The optical lens assembly according to claim 1, wherein one of the two adjacent lens elements is a first lens element, and another of the two adjacent lens elements is a second lens element comprising the adhesive entering tapered surface, the assembly portion of the first lens element comprises a surface located at an outer periphery of the first lens element, and the adhesive entering tapered surface and the surface has an included angle, wherein the included angle is larger than 0 degree and smaller than 90 degrees.

4. The optical lens assembly according to claim 1, wherein the optical lens assembly comprises an adhesive storage tank located between the axis-fixing tapered surfaces and the adhesive gap, and the adhesive storage tank is configured to accommodate the adhesive.

5. The optical lens assembly according to claim 1, wherein one of the two adjacent lens elements is a first lens element, and another of the two adjacent lens elements is a second lens element comprising the adhesive entering tapered surface, wherein an outer diameter of the second lens element is larger than an outer diameter of the first lens element.

6. The optical lens assembly according to claim 1, wherein one of the two adjacent lens elements is a first lens element, and another of the two adjacent lens elements is a second lens element comprising the adhesive entering tapered surface, wherein the second lens element is closer to an image sensor than the first lens element is.

7. The optical lens assembly according to claim 1, further comprising a housing, and the at least two lens elements being disposed in the housing.

8. The optical lens assembly according to claim 1, wherein a material of the adhesive comprises a light curing material or a thermal curing material.

9. An optical lens assembly, comprising:
   a first lens element, comprising an optical portion allowing imaging rays to pass through and an assembly portion configured to fix the first lens element;
   a gasket, comprising an assembly portion, wherein the assembly portion of the first lens element comprises a first adhesive surface, the assembly portion of the gasket comprises a second adhesive surface, and the first adhesive surface and the second adhesive surface are disposed opposite to each other to form a first adhesive gap; and
   an adhesive, distributed in the first adhesive gap and adhered to fix the first adhesive surface and the second adhesive surface disposed opposite to each other, wherein the second adhesive surface extends outwardly towards a direction away from a central axis of the gasket to form a first adhesive entering tapered surface configured to guide the adhesive into the first adhesive gap.

10. The optical lens assembly according to claim 9, wherein a width of the first adhesive gap is in a range of 0.002 millimeters to 0.05 millimeters.

11. The optical lens assembly according to claim 9, wherein the assembly portion of the first lens element comprises a surface located at an outer periphery of the first lens element, and the first adhesive entering tapered surface and the surface has an included angle, wherein the included angle is larger than 0 degree and smaller than 90 degrees.

12. The optical lens assembly according to claim 9, wherein the optical lens assembly comprises an adhesive storage tank, the adhesive storage tank is located between the first adhesive gap and the central axis of the gasket, and the adhesive storage tank is configured to accommodate the adhesive.

13. The optical lens assembly according to claim 9, wherein an outer diameter of the gasket is larger than an outer diameter of the first lens element.

14. The optical lens assembly according to claim 9, wherein the gasket is farther away from an object to be imaged than the first lens element is.

15. The optical lens assembly according to claim 9, further comprising a second lens element adjacent to and stacked disposed with the first lens element, and the gasket being disposed between the first lens element and the second lens element, the second lens element comprising an optical portion allowing the imaging rays to pass through and an assembly portion configured to fix the second lens element, the assembly portion of the second lens element comprising a third adhesive surface, the assembly portion of the gasket further comprising a fourth adhesive surface, and the third adhesive surface and the fourth adhesive surface being disposed opposite to each other to form a second adhesive gap, the adhesive further being distributed in the second adhesive gap and adhered to fix the third adhesive surface and the fourth adhesive surface disposed opposite to each other, wherein the third adhesive surface extends outwardly towards a direction away from an optical axis of the second lens element to form a second adhesive entering tapered surface configured to guide the adhesive into the second adhesive gap.

16. The optical lens assembly according to claim 15, wherein the assembly portion of the first lens element comprises a first axis-fixing tapered surface disposed between the first adhesive surface and the optical portion of the first lens element, and the assembly portion of the second lens element comprises a second axis-fixing tapered surface disposed between the third adhesive surface and the optical portion of the second lens element, wherein both the first axis-fixing tapered surface and the second axis-fixing tapered surface are in contact with the gasket such that the first lens element and the second lens element are coaxially fixed.

17. The optical lens assembly according to claim 9, further comprising a housing, and the first lens element and the gasket being disposed in the housing.

18. The optical lens assembly according to claim 9, wherein a material of the adhesive comprises a light curing material or a thermal curing material.

19. The optical lens assembly according to claim 9, wherein a viscosity of the adhesive is in a range of 100 mPas to 20000 mPa·s.

* * * * *